(12) United States Patent
Bauer et al.

(10) Patent No.: US 11,398,652 B2
(45) Date of Patent: Jul. 26, 2022

(54) STORAGE CELL FOR AN ENERGY STORE OF A MOTOR VEHICLE, AND ENERGY STORE FOR A MOTOR VEHICLE

(71) Applicant: Bayerische Motoren Werke Aktiengesellschaft, Munich (DE)

(72) Inventors: Christoph Bauer, Herrsching (DE); Thomas Hammerschmidt, Unterschleissheim (DE); Simon Nuernberger, Bad Aibling (DE); Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/256,075

(22) PCT Filed: May 22, 2019

(86) PCT No.: PCT/EP2019/063249
§ 371 (c)(1),
(2) Date: Dec. 24, 2020

(87) PCT Pub. No.: WO2020/001869
PCT Pub. Date: Jan. 2, 2020

(65) Prior Publication Data
US 2021/0273276 A1    Sep. 2, 2021

(30) Foreign Application Priority Data
Jun. 28, 2018    (DE) .................... 10 2018 210 660.6

(51) Int. Cl.
*H01M 10/615* (2014.01)
*H01M 10/625* (2014.01)
(Continued)

(52) U.S. Cl.
CPC ....... *H01M 10/615* (2015.04); *H01M 10/425* (2013.01); *H01M 10/625* (2015.04);
(Continued)

(58) Field of Classification Search
CPC ............. H01M 10/615; H01M 10/625; H01M 10/657; H01M 10/654; H01M 10/42–425
See application file for complete search history.

(56) References Cited

U.S. PATENT DOCUMENTS

| 3,623,916 A | 11/1971 | Toyooka et al. |
| 3,823,037 A | 7/1974 | Cairns et al. |

(Continued)

FOREIGN PATENT DOCUMENTS

| CA | 2 827 341 C | 1/2016 |
| DE | 1 671 855 A1 | 3/1972 |

(Continued)

OTHER PUBLICATIONS

International Search Report (PCT/ISA/210) issued in PCT Application No. PCT/EP2019/063249 dated Aug. 7, 2019 with English translation (five (5) pages).

(Continued)

*Primary Examiner* — Karie O'Neill Apicella
(74) *Attorney, Agent, or Firm* — Crowell & Moring LLP

(57) ABSTRACT

A storage cell for an energy store includes a cell housing in which storage means for storing electric energy are received, at least one connection which is arranged outside of the cell housing and via which the electric energy stored by the storage means can be provided, and at least one electric heating element arranged within the cell housing for heating the storage cell. The cell housing has a connection region, in (Continued)

which the heating element within the cell housing is electrically connected to the cell housing. At least one connection device is provided, having at least one connection element that has a first connection part, which is electrically connected to the cell housing outside of the cell housing and is made of a first material, and a second connection part, which is electrically connected to the first connection part and is made of a second material that differs from the first material.

12 Claims, 2 Drawing Sheets

(51) Int. Cl.
  *H01M 10/654* (2014.01)
  *H01M 10/657* (2014.01)
  *H01M 10/42* (2006.01)
(52) U.S. Cl.
  CPC ....... *H01M 10/654* (2015.04); *H01M 10/657* (2015.04); *H01M 2010/4271* (2013.01); *H01M 2220/20* (2013.01)

(56) References Cited

U.S. PATENT DOCUMENTS

| | | |
|---|---|---|
| 2019/0074559 A1 | 3/2019 | Demund et al. |
| 2019/0081371 A1 | 3/2019 | Bauer et al. |
| 2019/0214606 A1* | 7/2019 | Kurcik ................ H01M 10/655 |

FOREIGN PATENT DOCUMENTS

| | | |
|---|---|---|
| DE | 10 2013 221 747 A1 | 4/2015 |
| DE | 10 2013 021 258 A1 | 6/2015 |
| DE | 10 2016 208 062 A1 | 11/2017 |
| WO | WO 2015/102708 A2 | 7/2015 |
| WO | WO 2017/194373 A1 | 11/2017 |

OTHER PUBLICATIONS

German-language Written Opinion (PCT/ISA/237) issued in PCT Application No. PCT/EP2019/063249 dated Aug. 7, 2019 (seven (7) pages).

German-language Search Report issued in German Application No. 10 2018 210 660.6 dated Mar. 18, 2019 with partial English translation (11 pages).

* cited by examiner

STORAGE CELL FOR AN ENERGY STORE OF A MOTOR VEHICLE, AND ENERGY STORE FOR A MOTOR VEHICLE

BACKGROUND AND SUMMARY OF THE INVENTION

The invention relates to a storage cell for storing electrical energy for an energy store of a motor vehicle. The invention further relates to an energy store for a motor vehicle which is configured for storing electrical energy.

DE 10 2013 221 747 A1 discloses a battery cell which is particularly configured in the form of a lithium-ion battery cell, has a negative electrode, has a separator and has a positive electrode, which are provided in a wound form and are enclosed by a cell winding film. It is provided herein that the cell winding film comprises an integrated heating device.

A battery cell is moreover known from DE 10 2013 021 258 A1, having a housing and a heating device. It is provided herein that the heating device comprises at least one planar carrier element having at least one electrical heating element which is arranged therein and/or thereon. Moreover, the at least one planar carrier element is arranged on at least one wall of the housing. WO 2017/194373 A1 moreover discloses a heatable battery.

The object of the present invention is to further develop a storage cell and an energy store of the above-mentioned type, such that the spatial requirement for the storage cell and the energy store can be maintained within a particularly limited scope.

According to the invention, this object is achieved by a storage cell and by an energy store having the features of the independent claims. Advantageous configurations of the invention are the subject matter of the dependent claims.

A first aspect of the invention relates to a storage cell for an energy store of a motor vehicle, particularly of a motor vehicle which is preferably configured as a passenger motor vehicle. The storage cell is configured, for example, in the form of a battery cell, such that the energy store can be configured, for example, in the form of a battery. In particular, the storage cell, which is also referred to as a cell or a single cell, can be configured in the form of a lithium-ion cell, such that the energy store, for example, can be configured in the form of a lithium-ion battery. In particular, the energy store is configured in the form of a high-voltage component or in the form of a high-voltage store, wherein the energy store can be configured in the form of a high-voltage battery (HV battery). If the energy store is configured in the form of a high-voltage store, an electric voltage, particularly an electric operating voltage, which is delivered by or is present on the energy store is greater than 50 volts. Preferably, the electric voltage, particularly the electric operating voltage, is several hundred volts such that, for example, particularly high electrical capacities can be delivered for the electrical propulsion of the motor vehicle. In particular, the energy store, in its fully-assembled state, can comprise a plurality of electrically interconnected storage cells, wherein the preceding and following descriptions of the respective storage cell are also transferable to the other storage cells, and vice versa.

The storage cell comprises a cell housing and storage means for the storage of electrical energy or electric current. The storage means are accommodated in the cell housing. Electrical energy can thus be stored by means of, or in, the storage cell, such that electrical energy can be stored by means of the energy store or in the energy store. The storage means comprise, for example, at least two electrodes of different polarities and, for example, one electrolyte, for example a liquid electrolyte, in which the electrodes, at least partially, particularly at least predominantly or completely, are immersed or accommodated. A first of the electrodes is, for example, a positive electrode, whereas the second electrode, for example, is a negative electrode. The storage means can further comprise a separator which, for example, is arranged between the electrodes. The electrodes are electrically isolated from one another by means of the separator. The electrodes can, for example, form an electrode stack, or the electrodes are wound to form an electrode coil, which is also referred to as a jelly-roll. The separator can be arranged between the electrodes, such that the separator, for example, is wound together with the electrodes to form the electrode coil.

The storage cell comprises at least one connection, which is arranged externally to the cell housing and is also referred to as a terminal and which, for example, is electrically insulated with respect to the cell housing. Via the terminal, the storage means can deliver the electrical energy which is stored by way of the storage means. In other words, for example, the electrical energy, which is stored by way of the storage means, can be tapped off via the terminal and can thus be removed from the storage cell. For example, the terminal is electrically connected to one of the electrodes, wherein the terminal is preferably electrically connected to the one electrode within the cell housing.

The storage cell moreover comprises at least one electric heating element, which is arranged within the cell housing, for the heating or warm-up of the storage cell. In other words, the heating element is electrically operable such that, by means of the heating element, the storage cell can undergo heat-up by the employment of electrical energy. It is further conceivable that electrical energy can be fed to the storage means via the terminal, such that the electrical energy which is fed to the storage means via the terminal can be stored in the storage means. By means of the electric heating element and particularly by way of heating or warm-up of the storage cell which can be executed by means of the electric heating element, it is possible for the storage cell to have a sufficiently high temperature, even in the event of very low ambient or external temperatures, such that the storage cell can deliver the energy which is stored therein in a particularly effective manner, or such that electrical energy can be stored into the storage cell or stored in the storage cell in a particularly effective manner.

In order then to be able to maintain the spatial requirement for the storage cell and thus for the energy store as a whole within a particularly limited scope and in order to nevertheless be able to realize an advantageous heat-up of the storage cell in a space-saving manner, it is provided according to the invention that the cell housing comprises at least one or exactly one connection region, in which the heating element, within the cell housing, is electrically connected to the cell housing. In other words, the heating element is electrically connected to the connection region within the cell housing, such that the heating element is electrically connected to the cell housing within the cell housing. The heating element comprises, for example, at least one connection element, via which the heating element can be supplied with electrical energy for the heating of the storage cell. For example, within the cell housing, the connection element is electrically connected to the connection region and is thus electrically connected to the cell housing such that, for example, the heating element, through the agency of the cell housing, can be supplied with electrical energy for the heating of the storage cell, and can be operated thereby. As the connection element of the heating element, within the cell housing, is electrically connected to the connection region and thus to the cell housing, the necessity can be avoided for the connection element or the heating element to be brought out of the cell housing into its environment, such that the spatial requirement for the storage cell can be maintained within a particularly limited scope. It has proved to be particularly advantageous if the electrolyte is electrically insulated with respect to the cell housing. To this end, for example, an electrical insulator is arranged within the cell housing, by means of which insulator the electrolyte is electrically insulated from the cell housing. The electrical insulator is, for example, applied to, in particular deposited on, the cell housing, particularly an inner-circumferential shell surface which faces the electrolyte or the storage means such that, for example, the inner-circumferential shell surface of the cell housing is provided with the electrical insulator.

In order to be able to supply electrical energy to the heating element in a particularly space-saving manner, the storage cell according to the invention moreover comprises at least one connection device. The connection device comprises at least one connection element, which is preferably arranged entirely externally to the cell housing. The connection element comprises a first connection part, which is formed from a first material and, externally to the cell housing, is electrically connected to the cell housing. The connection element is preferably accommodated entirely externally to the cell housing, such that the first connection part, which is preferably arranged entirely externally to the cell housing, is electrically connected to the cell housing. The first connection part is thus electrically connected to the cell housing externally to the cell housing. In particular, it can be provided that the first connection part, in the connection region externally to the cell housing, is electrically connected to the cell housing such that, for example, the first connection part is electrically connected to the connection region and is thus electrically connected to the cell housing. In this manner, the heating element which is arranged in the cell housing, through the agency of the cell housing, is electrically connected to the first connection part.

The connection element moreover comprises a second connection part, which is at least electrically connected to the first connection part and is formed from a second material, which differs from the first material. The first material is, for example, a metallic material. Alternatively or additionally, the second material is a metallic material. The cell housing is, for example, formed from a substance, wherein it can be provided that the substance corresponds to the first material, or vice versa. The first material and/or the substance can be a metallic material such as, for example, a lightweight metal, particularly aluminum. The second material can be, for example, copper. As the connection parts are electrically interconnected, electrical energy or electric current can flow from one of the connection parts to the respective other connection part, or vice versa. In particular, the connection parts are then mechanically interconnected, and are thus mutually engaged, such that the connection element, for example, is an assembled or connected unit or component.

In order to be able to activate and deactivate the heating element in a particularly space-saving and appropriate manner, the connection device moreover comprises at least one switching element, particularly externally to the cell housing, which is electrically connected to the second connection part and which is preferably arranged entirely externally to the cell housing. By means of the switching element, the second connection part is electrically connectable to the terminal of the storage cell, and can be isolated from the terminal. The switching element is, for example, switchable between at least one connecting state and at least one isolating state. In the connecting state, the second connection part is electrically connected, via the switching element, to the terminal, such that electrical energy which is delivered by the storage means and which particularly flows to or onto the terminal, can be transmitted or is transmitted from the terminal via the switching element to the second connection part. The electrical energy can then be transmitted from the second connection part to the first connection part, and from the first connection part via the cell housing to the heating element or to the connection element and then to the heating element, such that the heating element can be supplied or is supplied with electrical energy which is stored by way of the storage means and is delivered by the storage means. The heating element is activated accordingly, as a result of which the storage cell undergoes heat-up by means of the heating element. Overall, it is apparent that, in the connecting state of the switching element, an electrical connection between the second connection part and the terminal is closed by means of the switching element, such that an electrical connection between the heating element and the terminal is closed by means of the switching element.

In the isolating state, however, the above-mentioned electrical connection between the second connection part and the terminal, or between the heating element and the terminal, is interrupted or opened by the switching element, as the switching element is opened. A supply of the heating element with electrical energy which is stored by way of the storage means is thus suspended such that, for example, in the isolating state, the heating element is deactivated. Heat-up of the storage cell which is executed by means of the heating element is thus suspended. As a result, by means of the switching element, the heating element can be deactivated and activated in a particularly appropriate and space-saving manner, such that appropriate heating of the storage cell can be achieved. A further advantage is provided in that the connection element, as it comprises the connection parts which are formed from mutually differing materials, in a particularly advantageous manner, can be at least electrically and preferably also mechanically connected to both the cell housing and to the switching element. In particular, the first material and the substance are selected such that the first material and the substance, in the interests of simple welding of the cell housing to the first connection part, are mutually appropriate. Moreover, for example, the second material can be selected such that it is appropriate to the switching element, in the interests of a simple connection, particularly welding, of the second connection part to the switching element.

The storage cell according to the invention permits a particularly high integration level, the achievement of short conduction paths, and the achievement of a highly effective thermal connection of the switching element such that, for example, excessive temperatures of the switching element can be prevented. Moreover, for example, a cell-specific actuation of the heating element is displayable. This means that, for example, the respective heating element can be activated or deactivated independently of the other respective heating elements of the other storage cells. Such a respective actuation of the respective heating element is controlled, for example, by means of a control chip which, for example, can also determine, in particular detect, a cell core temperature of the respective storage cell. An exact heating time, during which the storage cell undergoes heat-up by means of the heating element, can thus be accurately set, in particular controlled or regulated. In this manner, a "balancing" of the storage cells is displayable. By the term "balancing", it is to be understood that temperature differences and/or charge difference between the storage cells can be mutually equalized such that, in the energy store as a whole, an at least essentially uniform temperature distribution can be ensured. Moreover, the switching element permits a particularly effective actuation of the heating element, which is configured in the form of an intracellular heater, wherein any integration of switching elements on or in the storage cell, or on or in the terminal, which is also referred to as the cell terminal, can be avoided.

In order to be able to maintain the particularly limited spatial requirement, it can be provided that the connection device and the terminal are arranged on the same side of the storage cell or of the cell housing.

In a particularly advantageous embodiment of the invention, the switching element is arranged on a side of the first connection part which is averted from the cell housing in a first direction. Thus, for example, the first connection part, in a direction opposite to the first direction, is at least partially arranged between the switching element and the cell housing. At least a subregion of the first connection part projects beyond the switching element in a second direction which is oriented obliquely or perpendicularly to the first direction. In particular, it can be provided that at least the subregion of the first connection part, along a direction of extension which coincides with the second direction, is wider than the switching element. In the subregion, the first connection part is mechanically and electrically connected to the cell housing, particularly to the connection region of the cell housing. In this manner, the first connection part, and thus the connection element as a whole, can be mechanically and also electrically bonded to the cell housing in a particularly simple, space-saving and cost-effective manner.

It has proved to be particularly advantageous if the first connection part, in the subregion, is welded to the cell housing, and is thus electrically and mechanically connected to the cell housing. In particular, the first connection part, in the subregion, can be welded to the connection region of the cell housing, and can thus be electrically and mechanically connected to the connection region of the cell housing. As a result, a particularly space-saving and cost-effective mechanical and electrical connection of the connection element to the cell housing can be ensured.

In order to be able to maintain the spatial requirement and the costs of the storage cell, and thus of the energy store, particularly low, it is provided, in a further configuration of the invention, that the first connection part is welded to the cell housing, in particular to the connection region, at its outward-facing side. The side, for example in a mounting position of the storage cell, is upward-facing in a vertical direction of the vehicle, wherein the storage cell assumes its mounting position in the fully-assembled state of the motor vehicle. In this manner, it is possible for the first connection part, and thus the connection element, to be welded to the cell housing from above in a vertical direction of the vehicle and thus in a particularly simple and cost-effective manner.

A further embodiment is distinguished in that the connection device comprises a second connection element, which comprises a third connection part which is formed from a third material and which, particularly externally to the cell housing, is electrically connected to the switching element, and a fourth connection part, which is electrically connected to the third connection part and which is formed from a fourth material which differs from the third material. Preferably, the second connection element is arranged entirely externally to the cell housing. The fourth connection part, externally to the cell housing, is electrically connected to the terminal. Preferably, the third connection part and the fourth connection part are also mechanically interconnected, and thus mutually engaged such that, preferably, the second connection element also is an assembled or connected, and thus easily handleable unit. It is moreover preferably provided that the fourth connection part is also mechanically connected to the terminal and/or the fourth connection part is mechanically connected to the switching element. It is moreover preferably provided that the second connection part is mechanically connected to the switching element. By the employment of the second connection element, an at least electrical connection of the switching element to the terminal, externally to the cell housing, can be ensured, said connection being particularly space-saving and particularly simple. In particular, it is thus possible for the third material to be selected such that, in the interests of a simple electrical and/or mechanical and/or materially bonded connection, particularly soldering and/or welding, it is compatible with the switching element. Moreover, the fourth material can be selected such that, in the interests of simple welding, it is compatible with the terminal, such that the connection element, in a particularly simple and space-saving manner, can be at least electrically and preferably also mechanically connected to both the switching element and the terminal.

The third material can be copper. Alternatively or additionally, the fourth material can be a lightweight metal such as, for example, aluminum. In particular, it is possible that the third material is a metallic material. Alternatively or additionally, the fourth material is a metallic material. The respective first, second, third and fourth material is preferably an electrically conducting or an electrically conductive material.

In order to be able to maintain the spatial requirement and the costs within a particularly limited scope, in a further configuration of the invention, it is provided that the first material corresponds to the fourth material.

A further embodiment is distinguished in that the second material corresponds to the third material. As a result, the costs and the spatial requirement can be maintained within a particularly limited scope.

In a further configuration of the invention, the switching element comprises a circuit board, particularly a rigid circuit board, which is preferably dimensionally stable or integrally rigid. At least one switch of the switching element is arranged on the circuit board, wherein the switch is preferably electrically connected to the circuit board. In particular, the switch is secured on the circuit board. The switch can, for example, be switched over, in particular moved, between the connecting state and the isolating state. The switch is preferably configured in the form of a MOSFET, such that the switch can be particularly advantageously and appropriately opened and closed. The circuit board, particularly externally to the cell housing, is electrically connected to the second connection part. Accordingly, electric current can be particularly advantageously transmitted between the circuit board and the second connection part such that electric current can be particularly advantageously transmitted from the terminal via the circuit board to the heating element. The second connection part is electrically and preferably also mechanically connected to the circuit board wherein, preferably, the second connection part is connected, particularly soldered, to the circuit board in a materially bonded manner.

A further embodiment is distinguished in that the circuit board, particularly externally to the cell housing, is electrically connected to the third connection part. As a result, a particularly advantageous current transmission can be ensured. In particular, the third connection part is electrically and preferably also mechanically connected to the circuit board, wherein the third connection part can be soldered to the circuit board.

In order to be able to achieve a particularly space-saving and cost-effective overall layout of the energy store, in a further configuration of the invention, it is provided that the storage cell comprises at least one elastically deformable electrical conductor, which is at least electrically and preferably also mechanically connected to the circuit board and via which the circuit board is electrically connectable to at least one further component, wherein the circuit board is stiffer or more rigid than the conductor. This means that the electrical conductor, by means of a force which is applied to the electrical conductor, is elastically deformable, wherein this force would not yet result in any deformation, in particular any elastic deformation, of the circuit board. The circuit board and the electrical conductor form a "rigid-flex circuit board", as the circuit board is significantly stiffer or more rigid than the electrical conductor, and cannot be elastically deformed with respect to the electrical conductor. In comparison with the circuit board, the conductor can be elastically deformed with significantly greater ease and in response to significantly lower forces, such that the electrical conductor permits a particularly advantageous and electrical connection between the circuit board and the component. In the event of the occurrence, for example during operation of the energy store, of thermally-related relative movements between the circuit board and the component, the electrical conductor can be elastically and thus non-destructively deformed by these relative movements, such that the electrical conductor jointly executes or permits the relative movements. As a result, the component and the circuit board remain electrically interconnected, even during the relative movements, specifically by means of the electrical conductor.

The further component is, for example, a circuit board of a switching element of a further storage cell of the energy store such that, for example, the heating element of the further storage cell can be particularly advantageously supplied with electrical energy by means of the electrical conductor and/or that the circuit board or the switching element of the further component can be actuated by means of the electrical conductor, in order to then supply the heating element, in the actuated, closed state, with electrical energy from the energy store which is connected to the component.

For example, the component is arranged with a spacing from the circuit board such that a clearance extending along at least one spatial direction is provided between the component and the circuit board. The electrical conductor preferably has a length which is greater than the clearance, such that the electrical conductor can jointly execute, for example, thermally-related changes in the clearance in a non-destructive manner, in that the electrical conductor is elastically deformed. To this end, the conductor, for example at least in one longitudinal region, has a zig-zag and/or preferably corrugated profile which, in the event of an enlargement of the clearance, is extended or deflected and, in the event of a reduction of the clearance, is compressed. As a result, the component and the circuit board can remain electrically interconnected whilst moving relative to one another, for example in a thermally-related manner.

A second aspect of the invention relates to an energy store for a motor vehicle. The energy store according to the invention comprises at least one storage cell according to the invention, or a plurality of storage cells according to the invention, which are preferably electrically interconnected. Advantages and advantageous configurations of the first aspect of the invention are to be considered as advantages and advantageous configurations of the second aspect of the invention, and vice versa.

Further details of the invention proceed from the following description of one preferred exemplary embodiment, together with the associated drawings.

BRIEF DESCRIPTION OF THE DRAWINGS

In the figures, identical or functionally identical elements are identified by the same reference designations.

DETAILED DESCRIPTION OF THE DRAWINGS

Figure 1:
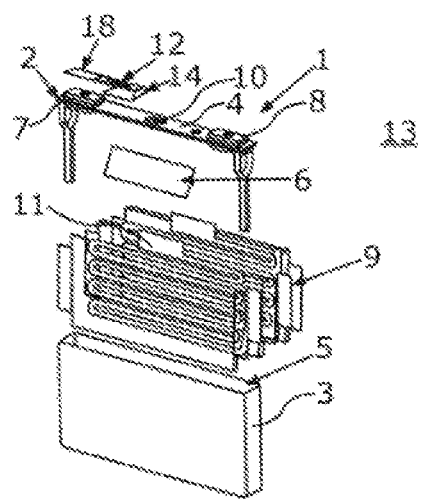
FIG. 1 is a schematic exploded view of a storage cell according to an embodiment of the invention for storing electrical energy for an energy store of a motor vehicle.

FIG. 1 shows a schematic exploded view of a storage cell 1 for an energy store of a motor vehicle, particularly of a motor vehicle which is configured, for example, in the form of a passenger motor vehicle. The motor vehicle, in its fully-assembled state, comprises at least one electrical machine, by means of which the motor vehicle can be electrically propelled. For the electrical propulsion of the motor vehicle, the electrical machine is supplied with electrical energy or electric current, which is stored in the energy store. The energy store herein comprises, for example, a plurality of storage cells, which are configured in the manner of the storage cell 1, or the storage cell 1 is one of the storage cells of the energy store. The storage cells of the energy store are electrically interconnected, such that the energy store can deliver a particularly high electric voltage, particularly an electric operating voltage, in order to be able to achieve particularly high electrical capacities for the electrical propulsion of the motor vehicle. The electric voltage of the energy store is preferably several hundred volts.

The storage cell 1 comprises a cell housing 2, which is also simply referred to as a housing. The cell housing 2 comprises a first housing part 3, which is also referred to as a can, and a second housing part 4, which is also referred to as a cap. The housing parts 3 and 4 are, for example, components which are configured separately from one another and are interconnected. The housing part 4 is also referred to as a cover. The cell housing 2, in its fully-assembled state, delimits a location space 5 in which, in FIG. 1, particularly schematically represented storage means 6 for the storage of electrical energy are accommodated. The storage means 6 comprise, for example, at least or exactly two electrodes of differing polarity, and an in particular liquid electrolyte, in which the electrodes are at least partially accommodated. The storage means 6 can further comprise a separator, which is arranged between the electrodes. Accordingly, the electrodes are electrically insulated from one another by means of the separator. A first of the electrodes is, for example, a positive electrode, whereas the second electrode is a negative electrode.

The storage cell 1 moreover comprises connections 7 and 8, which are also referred to as terminals and which are arranged at least partially externally to the cell housing 2. The terminals 7 and 8 are secured to the housing part 4 and, for example, are electrically insulated with respect to the cell housing 2. The positive electrode is, for example, electrically connected to the terminal 7 within the cell housing 2, whereas the negative electrode is electrically connected to the terminal 8 within the cell housing 2. Thus, for example, the terminal 7 forms a positive electrical pole of the storage cell 1, whereas the terminal 8 forms a negative electrical pole of the storage cell 1. The storage means 6 can deliver the electrical energy which is stored by way of the storage means 6 via the terminals 7 and 8, as a result of which, for example, the electrical machine can be supplied with the electrical energy which is stored by way of the storage means 6.

The storage cell 1 further comprises at least one electric heating element 9, which is arranged in the location space 5 and thus within the cell housing 2 and by means of which the storage cell 1 can be heated by the use of electrical energy and can thus undergo warm-up. It can be seen from FIG. 1 that a plurality of electric heating elements 9 can be arranged within the cell housing 2. Moreover, a rupture membrane 10 is provided on the housing part 4, by means of which membrane the location space 5 can be deliberately vented, for example in the case of a thermal event. An uncontrolled explosion of the storage cell 1 can thus be securely prevented. By reference to the exemplary storage cell 1, it can be seen that each of the storage cells of the energy store can comprise at least one electric heating element, such as the electric heating element 9.

In order then to be able to maintain the spatial requirement for the storage cell 1 and thus for the energy store as a whole within a particularly limited scope, the cell housing 2, in particular the housing part 4, comprises a connection region V, in which the heating element 9 is electrically connected to the cell housing 2 within the cell housing 2. To this end, for example, the heating element 9 comprises a connection element 11. The connection element 11 is at least electrically and preferably also mechanically connected to the connection region V and thus to the cell housing 2. As a result, for example, the connection element 11, through the agency of the cell housing 2, can be supplied with electrical energy, which can thus be fed, through the agency of the cell housing 2 and via the connection element 11, to the heating element 9. By means of this electrical energy which is fed to the heating element 9, the heating element 9 can be operated such that, by means of the electrical energy which is fed to the heating element 9, the storage cell 1 can undergo heat-up. If electrical energy is supplied to the electric heating element 9, the electric heating element 9 is activated accordingly. As a result, the storage cell 1 undergoes heat-up by means of the electric heating element 9. In the absence of a supply of electrical energy to the heating element 9, the heating element 9 is deactivated accordingly, such that heat-up of the storage cell 1 executed by the heating element 9 is prevented.

For example, the connection element 11 is welded to the connection region V and thus to the cell housing 2, as a result of which the connection element 11 and thus the heating element 9 are electrically and preferably also mechanically connected to the cell housing 2, in particular to the housing part 4.

The storage cell 1 moreover comprises at least one, or preferably exactly one, connection device 12. The connection device 12 is preferably arranged entirely externally to the cell housing 2 and thus in the surroundings 13 thereof. The connection device 12 comprises a first connection element 14, which comprises a first connection part 15 which is formed from a first material and is electrically connected to the cell housing 2 externally to the cell housing 2, and a second connection part 16, which is electrically and also mechanically connected to the first connection part and is formed from a second material which differs from the first material. In the exemplary embodiment illustrated in the figures, the first material is aluminum, whereas the second material is copper. The connection device 12 moreover comprises at least one, or exactly one, switching element 17, which is electrically and preferably also mechanically connected to the second connection part 16. By means of the switching element 17, the second connection part 16 and thus the heating element 9 are electrically connectable to the terminal 7, and isolatable from the terminal 7. As the connection part 15 is electrically connected to the connection region V or to the cell housing 2, the connection part 15 and thus the connection element 14 as a whole, through the agency of the cell housing 2, are electrically connected to the connection element 11 and thus to the heating element 9. Moreover, the switching element 17 is electrically connected to the connection element 14.

The connection device 12 moreover comprises a second connection element 18, which comprises a third connection part 19, which is formed from a third material and is electrically and preferably also mechanically connected to the switching element 17, and a fourth connection part 20, which is electrically and preferably also mechanically connected to the third connection part 19 and is formed from a fourth material which differs from the third material and which is electrically connected to the terminal 7 externally to the cell housing 2. The third material is preferably copper, and the fourth material is preferably aluminum.

Figure 2:
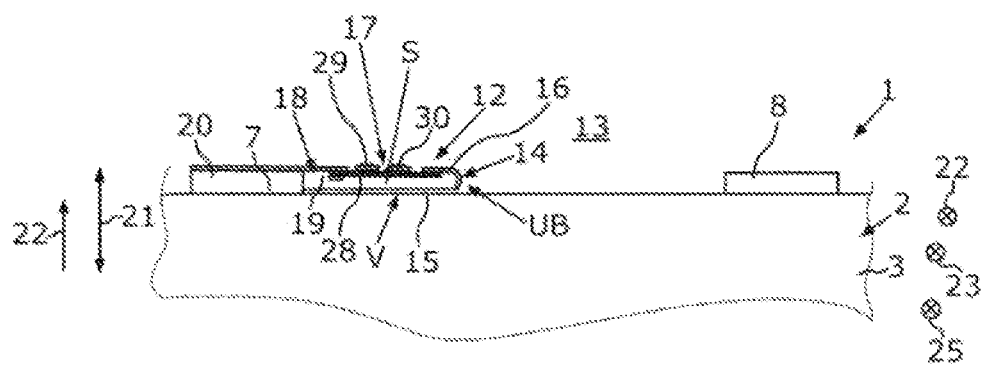
FIG. 2 is a sectional representation of a schematic side view of the storage cell.

Moreover, the connection part 15 is mechanically connected to the cell housing 2, particularly to the housing part 4, and the connection part 20 is preferably mechanically connected to the terminal 7. Overall, it can be seen that the connection element 11 and thus the heating element 9, via the cell housing 2, the connection element 14, the switching element 17 and the connection element 18, can be supplied with electrical energy which is stored by way of the storage means 6 and delivered by the storage means 6 via the terminal 7, and can be operated accordingly. The connection element 14 comprises an arced or arc-shaped transition region UB, such that the connection parts 15 and 16, along a direction which is indicated in FIG. 2 by a double-headed arrow 21, at least partially mutually overlap. The connection part 15 is thus arranged along the direction, which is indicated by the double-headed arrow 21, between the cell housing 2 and the connection part 16.

Figure 3:
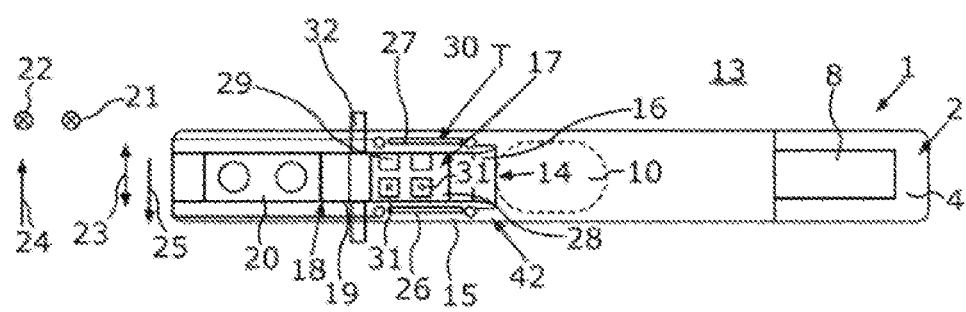
FIG. 3 is a schematic overhead view of the storage cell.

It is moreover provided that the switching element 17 and the connection part 16 are arranged on a side S of the first connection part 15 which is averted from the cell housing 2 in a first direction which is indicated by an arrow 22. As can be seen from FIG. 3, at least one subregion T of the first connection part 15, along a second direction which, in FIG. 3, is indicated by a double-headed arrow 23 and which, in the present case, is oriented perpendicularly to the first direction indicated by the arrow 22, is wider than the switching element 17 and than the connection part 16. As a result, at least the subregion T projects beyond the switching element 17 and the connection part 16 in a third direction, which is oriented perpendicularly to the first direction and, in FIG. 3, is indicated by an arrow 24, and in a fourth direction, which is oriented in opposition to the third direction, perpendicularly to the first direction, and is indicated in FIG. 3 by an arrow 25. The first connection part 15, in the subregion T, is mechanically and electrically connected to the cell housing 2, particularly to the connection region V. In other words, the subregion T, in the first direction indicated by the arrow 22, is arranged with no overlap with respect to the switching element 17 and to the connection part 16, such that the subregion T, from the side S, can be welded to the cell housing 2 and thus electrically and mechanically connected to the cell housing 2 in a particularly simple manner. In this regard, respective welded joints 26 and 27 are illustrated in FIG. 3, along which the connection part 15 is welded to the cell housing 2.

Figure 4:
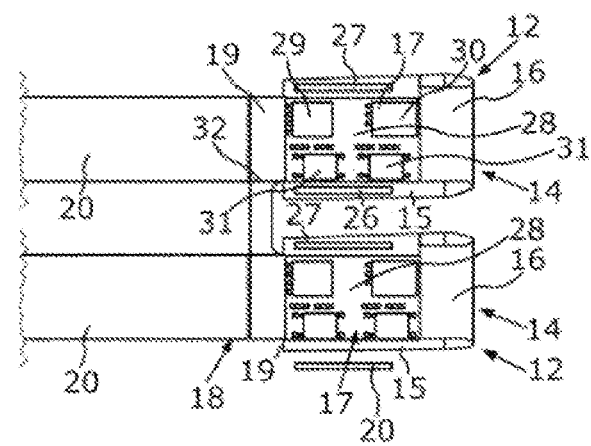
FIG. 4 is a schematic overhead view of a connection device of the storage cell.
Figure 5:
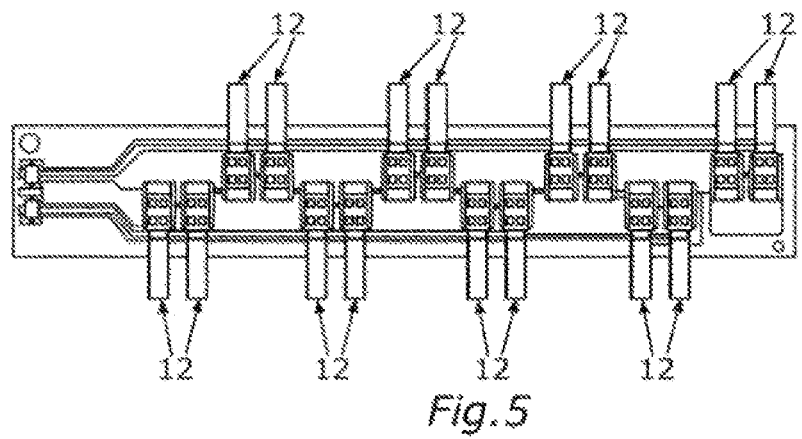
FIG. 5 is a schematic overhead view of connection devices of respective storage cells.

It can be particularly clearly seen from FIGS. 4 and 5 that the switching element 17 comprises a circuit board 28, on which two switches 29 and 30 of the switching element 17 are arranged, which are electrically connected to the circuit board 28 and are configured, for example, in the form of MOSFETs. The switches 29 and 30 are secured to the circuit board 28. At least one, or exactly one, optical coupler 31 is assigned to the respective switches 29 or 30, by means of which optical coupler a switchover of the respectively assigned switch 29 or 30 can be executed. The optical couplers 31 are also secured to the circuit board 28. The circuit board 28 is at least electrically and preferably also mechanically connected to the connection parts 16 and 19.

The storage cell 1 moreover comprises at least one elastically deformable electrical conductor 32, which is electrically connected to the circuit board 28 and is less rigid that the circuit board 28. In other words, the circuit board 28 is configured with higher rigidity than the electrical conductor 32. By means of the electrical conductor 32, the circuit board 28 is electrically connectable or connected to at least one further component of the energy store. This further component—as can be seen from FIGS. 4 and 5—is at least one circuit board of a switching element of another of the storage cells of the energy store, such that, for example, the circuit boards of the switching elements of the storage cells of the energy store can be electrically interconnected in a particularly advantageous manner by means of the electrical conductor 32. In the event of the occurrence, for example, of thermally-related relative movements between the storage cells, there are resulting changes in a clearance between the storage cells. The elastically deformable electrical conductor 32 can jointly execute these relative movements for electrical purposes, in that the electrical conductor 32 is elastically and thus non-destructively deformed in response to the relative movements. As a result, the circuit boards of the storage cells, notwithstanding their relative movements, can remain at least electrically interconnected by means of the electrical conductor 32.

The side S, for example in a mounting position of the storage cell 1, is upward-facing in a vertical direction of the vehicle such that, as the connection part 15 is wider than the switching element 17, the connection part 15 can be welded to the cell housing 2 from above in a particularly simple manner.

In the fully-assembled state of the energy store, the storage cells, particularly by means of their terminals, are electrically interconnected. To this end, a cell contacting system (CCS), also referred to as a cell contact-connection system is provided, by means of which the storage cells are electrically interconnected. In particular, the respective terminals of the respective storage cells are electrically interconnected by means of the cell contacting system. The respective connection device 12 is arranged along the direction indicated by the double-headed arrow 21 below the cell contacting system and thus between the cell contacting system and the respective cell housing 2. In other words, the respective connection device 12 can underlie the cell contacting system, such that the connection device 12 does not obstruct the cell contacting system or the installation thereof. The energy store can thus be optionally equipped with the connection devices 12, or the connection devices 12 can simply be omitted, wherein, in both cases, the cell contacting system can be installed in the same way.

LIST OF REFERENCE DESIGNATIONS

1 Storage cell
2 Cell housing
3 Housing part
4 Housing part
5 Location space
6 Storage means
7 Terminal
8 Terminal
9 Heating element
10 Rupture membrane
11 Connection element
12 Connection device
13 Surroundings
14 Connection element
15 First connection part
16 Second connection part
17 Switching element
18 Second connection element
19 Third connection part
20 Fourth connection part
21 Double-headed arrow
22 Arrow
23 Double-headed arrow
24 Arrow
25 Arrow
26 Welded joint
27 Welded joint
28 Circuit board
29 Switch
30 Switch
31 Optical coupler
32 Electrical conductor
S Side
T Subregion
Transition region
V Connection region

What is claimed is:

1. A storage cell for an energy store of a motor vehicle, comprising:
a cell housing, in which storage means for storing electrical energy are accommodated;
at least one terminal which is arranged externally to the cell housing and via which the electrical energy which is stored by way of the storage means is delivered, and
at least one electric heating element, which is arranged within the cell housing, for the heat-up of the storage cell,
wherein
the cell housing comprises a connection region, in which the heating element, within the cell housing, is electrically connected to the cell housing; and
at least one connection device is provided, which comprises:
at least one connection element, which comprises a first connection part which is formed from a first material and, externally to the cell housing, is electrically connected to the cell housing, and a second connection part, which is electrically connected to the first connection part and is formed from a second material which differs from the first material; and at least one switching element which is electrically connected to the second connection part and by which the second connection part is electrically connectable to the terminal and isolatable from the terminal.

2. The storage cell according to claim 1, wherein the switching element is arranged on a side of the first connection part which is averted from the cell housing in a first direction, at least a subregion of the first connection part projects beyond the switching element in a second direction which is oriented obliquely or perpendicularly to the first direction, and the first connection part, in the subregion, is mechanically and electrically connected to the cell housing.

3. The storage cell according to claim 2, wherein the first connection part, in the subregion, is welded to the cell housing so as to be electrically and mechanically connected to the cell housing.

4. The storage cell according to claim 3, wherein the first connection part, from the side, is welded to the cell housing.

5. The storage cell according to claim 1, wherein the at least one connection device further comprises a second connection element, which comprises a third connection part which is formed from a third material and is electrically connected to the switching element, and a fourth connection part, which is electrically connected to the third connection part and is formed from a fourth material which differs from the third material and which, externally to the cell housing, is electrically connected to the terminal.

6. The storage cell according to claim 5, wherein the first material corresponds to the fourth material.

7. The storage cell according to claim 6, wherein the second material corresponds to the third material.

8. The storage cell according to claim 1, wherein the switching element comprises a circuit board, on which at least one switch of the switching element, which switch is electrically connected to the circuit board, is arranged, and the circuit board is electrically connected to the second connection part.

9. The storage cell according to claim 5, wherein the switching element comprises a circuit board, on which at least one switch of the switching element, which switch is electrically connected to the circuit board, is arranged, and the circuit board is electrically connected to the second connection part.

10. The storage cell according to claim 9, wherein the circuit board is electrically connected to the third connection part.

11. The storage cell according to claim 10, further comprising:

at least one elastically deformable electrical conductor, which is electrically connected to the circuit board and by which the circuit board is electrically connectable to at least one further component, wherein the circuit board is more rigid than the conductor.

12. An energy store for a motor vehicle comprising at least one storage cell according to claim 1.

* * * * *